(12) United States Patent
James et al.

(10) Patent No.: US 8,162,728 B2
(45) Date of Patent: Apr. 24, 2012

(54) DUAL-PORE STRUCTURE POLISHING PAD

(75) Inventors: David B. James, Newark, DE (US); Henry Sanford-Crane, Elkton, MD (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 11 days.

(21) Appl. No.: 12/586,859

(22) Filed: Sep. 28, 2009

(65) Prior Publication Data

US 2011/0076928 A1    Mar. 31, 2011

(51) Int. Cl.
*B24D 11/00* (2006.01)

(52) U.S. Cl. .................. 451/527; 428/304.4; 428/315.7

(58) Field of Classification Search .................. 451/527; 428/304.4, 315.7
See application file for complete search history.

(56) References Cited

U.S. PATENT DOCUMENTS

| | | | |
|---|---|---|---|
| 4,841,680 A | 6/1989 | Hoffstein et al. | |
| 6,089,965 A * | 7/2000 | Otawa et al. | 451/527 |
| 6,095,902 A | 8/2000 | Reinhardt | |
| 6,099,954 A | 8/2000 | Urbanavage et al. | |
| 6,120,353 A | 9/2000 | Suzuki et al. | |
| 6,284,114 B1 | 9/2001 | Chechik et al. | |
| 6,419,556 B1 | 7/2002 | Urbanavage et al. | |
| 6,439,965 B1 | 8/2002 | Ichino et al. | |
| 6,623,337 B2 | 9/2003 | Scott et al. | |
| 6,626,740 B2 | 9/2003 | Baker, III et al. | |
| 6,896,593 B2 | 5/2005 | Prasad | |
| 6,899,598 B2 | 5/2005 | Prasad | |
| 6,899,602 B2 | 5/2005 | Fawcett et al. | |
| 6,913,517 B2 | 7/2005 | Prasad | |
| 6,935,931 B2 | 8/2005 | Prasad | |
| 7,134,952 B2 | 11/2006 | Horie et al. | |
| 7,220,475 B2 | 5/2007 | Kume et al. | |
| 7,267,601 B2 | 9/2007 | Horie et al. | |
| 7,267,607 B2 | 9/2007 | Prasad | |
| 7,311,862 B2 | 12/2007 | Prasad | |
| 7,435,165 B2 | 10/2008 | Prasad | |
| 2005/0112354 A1 | 5/2005 | Kume et al. | |
| 2006/0046622 A1 | 3/2006 | Prasad | |
| 2007/0117393 A1 | 5/2007 | Tregub et al. | |
| 2008/0057845 A1 | 3/2008 | Prasad | |
| 2009/0093200 A1 | 4/2009 | Iwase et al. | |

* cited by examiner

*Primary Examiner* — Maurina Rachuba
(74) *Attorney, Agent, or Firm* — Blake T. Biederman

(57) ABSTRACT

The polishing pad is useful for polishing at least one of magnetic, optical and semiconductor substrates. A porous polishing layer includes a dual porosity structure within a polyurethane matrix. The dual porosity structure has a primary set of pores having pore walls with a thickness of 15 to 55 μm and a storage modulus of 10 to 60 MPa measured at 25° C. In addition, pore walls contain a secondary set of pores having an average pore size of 5 to 30 μm. The porous polishing layer is either fixed to a polymeric film or sheet substrate or formed into a woven or non-woven structure to form the polishing pad.

10 Claims, No Drawings

DUAL-PORE STRUCTURE POLISHING PAD

BACKGROUND OF THE INVENTION

The invention relates to porous polyurethane polishing pads useful for polishing at least one of magnetic, optical and semiconductor substrates. For example, the polishing pads are particularly useful for chemical mechanical polishing (CMP) of semiconductor wafer materials and, more particularly, to low-defect methods for polishing semiconductor substrates.

The production of semiconductors typically involves several chemical mechanical polishing (CMP) processes. In each CMP process, a polishing pad in combination with a polishing solution, such as an abrasive-containing polishing slurry or an abrasive-free reactive liquid, removes excess material in a manner that planarizes or maintains flatness for receipt of a subsequent layer. The stacking of these layers combines in a manner that forms an integrated circuit. The fabrication of these semiconductor devices continues to become more complex due to requirements for devices with higher operating speeds, lower leakage currents and reduced power consumption. In terms of device architecture, this translates to finer feature geometries and increased numbers of metallization levels. These increasingly stringent device design requirements are driving the adoption of smaller and smaller line spacing with a corresponding increase in pattern density. The devices' smaller scale and increased complexity have led to greater demands on CMP consumables, such as polishing pads and polishing solutions. In addition, as integrated circuits' feature sizes decrease, CMP-induced defectivity, such as, scratching becomes a greater issue. Furthermore, integrated circuits' decreasing film thickness requires improvements in defectivity while simultaneously providing acceptable topography to a wafer substrate; these topography requirements demand increasingly stringent planarity, line dishing and small feature array erosion polishing specifications. Furthermore higher polishing removal rates are required to improve wafer throughput and, since both metal and dielectric materials are being polished simultaneously, the relative removal rates of metal to dielectric materials are important. In order to satisfy future wafer integration needs, higher dielectric (e.g. TEOS) to metal (e.g. copper) removal rate selectivity ratios are required.

Historically, cast polyurethane polishing pads have provided the mechanical integrity and chemical resistance for most polishing operations used to fabricate integrated circuits. For example, polyurethane polishing pads have sufficient tensile strength and elongation for resisting tearing; abrasion resistance for avoiding wear problems during polishing; and stability for resisting attack by strong acidic and strong caustic polishing solutions. The IC1000™ polishing pad supplied by Dow Electronic Materials represents the industry standard polyurethane polishing pad suitable for polishing multiple substrates, such as aluminum, barrier materials, dielectrics, copper, hard masks, low-k dielectric, tungsten and ultra low-k dielectrics (IC1000 is a trademark of Dow Electronic Materials or its affiliates.).

Over the last several years, semiconductor manufacturers have been moving increasingly to poromeric polishing pads, such as Politex™ polyurethane pads for finishing or final polishing operations in which low defectivity is a more important requirement (Politex is a trademark of Dow Electronic Materials or its affiliates.). For purposes of this specification the term poromeric refers to porous polyurethane polishing pads produced from aqueous or non-aqueous solutions. The advantage of these polishing pads is that they provide efficient removal with low defectivity. This decrease in defectivity can result in a dramatic wafer yield increase.

A polishing application of particular importance is copper-barrier polishing in which low defectivity is required in combination with the ability to remove both copper and TEOS dielectric simultaneously, such that the TEOS removal rate is higher than the copper removal rate to satisfy advanced wafer integration designs. Commercial pads such as Politex polishing pads do not deliver sufficiently low defectivity for future designs nor is the TEOS:Cu selectivity ratio high enough. Other commercial pads contain surfactants that leach during polishing to produce excessive amounts of foam that disrupts polishing. Furthermore, the surfactants may contain alkali metals that can poison the dielectric and reduce the semiconductor's functional performance.

Despite the low TEOS removal rate associated with poromeric polishing pads, some advanced polishing applications are moving toward all-poromeric pad CMP polishing operations because of the potential of achieving lower defectivity with poromeric pads versus other pad types such as IC1000 polishing pads. Although these operations provide low defects, the challenges remain to further decrease pad-induced defects and to increase polishing rate.

STATEMENT OF THE INVENTION

An aspect of the invention provides a polishing pad useful for polishing at least one of magnetic, optical and semiconductor substrates, comprising a porous polishing layer, the porous polishing layer having a dual porosity structure within a polyurethane matrix, the dual porosity structure having a primary set of pores, the primary set of pores having pore walls, the pore walls having a thickness of 15 to 55 μM, a storage modulus of 10 to 60 MPa measured at 25° C. and containing a secondary set of pores within the pore walls, the secondary set of pores having an average pore size of 5 to 30 μm and wherein the porous polishing layer is either fixed to a polymeric film or sheet substrate or formed into a woven or non-woven structure to form the polishing pad.

Another aspect of the invention provides a polishing pad useful for polishing at least one of magnetic, optical and semiconductor substrates, comprising a porous polishing layer, the porous polishing layer having a dual porosity structure within a polyurethane matrix, the dual porosity structure having a primary set of pores, the primary set of pores having pore walls and an average diameter of at least 40 μm, the pore walls having a thickness of 20 to 50 μm, a storage modulus of 10 to 50 MPa measured at 25° C. and containing a secondary set of pores within the pore walls, the secondary set of pores having an average pore size of 5 to 25 μm and wherein the porous polishing layer is either fixed to a polymeric film or sheet substrate or formed into a woven or non-woven structure to form the polishing pad.

DETAILED DESCRIPTION

The polishing pad of the invention is useful for polishing at least one of magnetic, optical and semiconductor substrates. In particular, the polyurethane pad is useful for polishing semiconductor wafers; and in particular, the pad is useful for polishing advanced applications such as copper-barrier applications in which very low defectivity is more important than the ability to planarize and in which it is necessary to remove multiple materials simultaneously such as copper, barrier metals and dielectric materials, including but not limited to TEOS, low k and ultra-low k dielectrics. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof. In order to avoid foaming issues and potential poisoning of the dielectric, these formulations are advantageously surfactant-free formulations. The polishing pad includes a porous polishing layer having a dual pore structure within a polyurethane matrix coated on a supporting base substrate. The dual pore structure has a primary set of larger pores and a secondary set of smaller pores within and between the cell walls of the larger pores. This dual porosity structure serves to reduce defects while increasing removal rate for some polishing systems.

The porous polishing layer is either fixed to a polymeric film substrate or formed into a woven or non-woven structure to form the polishing pad. When depositing the porous polishing layer onto a polymeric substrate, such as a non-porous poly(ethyleneterephthalate) film or sheet, it is often advantageous to use a binder, such as a proprietary urethane or acrylic adhesive to increase adhesion to the film or sheet. Although these films or sheets may contain porosity, advantageously these films or sheets are non-porous. The advantage of non-porous films or sheets is that they promote uniform thickness or flatness, increase the overall stiffness and decrease the overall compressibility of the polishing pad, and eliminate slurry wicking effects during polishing.

In an alternative embodiment, a woven or non-woven structure serves as a base for the porous polishing layer. Although the use of non-porous films as the base substrate has benefits as outlined above, films also have disadvantages. Most notably, air bubbles can be trapped between the polishing pad and the platen of the polishing tool when non-porous film is used as the base substrate. This results in major issues with polishing non-uniformity, higher defectivity, high pad wear and reduced pad life. These problems are eliminated when felt is used as the base substrate since air can permeate through the felt and air bubbles are not trapped. Secondly, when the polishing layer is applied to film the adhesion of the polishing layer to the film depends on the strength of the adhesive bond. Under some aggressive polishing conditions, this bond can fail and result in catastrophic failure of polishing. When felt is used the polishing layer actually penetrates a certain depth into the felt and forms a strong, mechanically interlocked interface. Although woven structures are acceptable, non-woven structures can provide additional surface area for strong bonding to the porous polymer substrate. An excellent example of a suitable non-woven structure is a polyester felt impregnated with a polyurethane to hold the fibers together. Typical polyester felts will have a thickness of 500 to 1500 μm.

The primary set of pores (herein also referred to as the macropores) are open to the polishing surface and typically have an average diameter of at least 35 μm. For purposes of the specification, the average diameter of the primary pores represents the average maximum width of pores measured in a transverse cross section in a direction parallel to the polishing pad's polishing surface. Advantageously, the primary or macropores have an average diameter of at least 40 μm. These large pores facilitate slurry transport and polishing debris removal. The macropores have an elongated structure orthogonal to the polishing surface and provide consistent polishing surface area throughout the life of the polishing pad. The primary pores may have tapered side walls or preferably a columnar structure with vertical side walls.

In addition, the primary set of pores contain pore walls. These pore walls have a thickness of 15 to 55 μm. This wall thickness contributes to the pad's stiffness and polishing ability. If the cell wall is too thin, it will lack the rigidity required for consistent polishing, pad wear will be high and pad life shortened. Similarly, if the cell wall is too thick it will lack the proper structure for effective polishing. Advantageously, the cell wall has a thickness of 20 to 50 μm. In addition to thickness, it is important that the cell wall has the necessary stiffness or modulus to transfer an appropriate polishing force to the target substrate, such as a wafer, while at the same time having a modulus that is low enough to achieve low defectivity polishing. For purposes of the specification, the modulus represents the material's tensile storage modulus (E') measured after dissolving the polymer in dimethylformamide, coating the solution onto a glass plate, removing the solvent at elevated temperature, then removing the dried coating from the glass plate to leave a free-standing non-porous film, conditioning the film for 5 days at 25° C. at 50% humidity and then testing at a frequency of 10/rad/sec and a temperature of 25° C. in accordance with ASTM D5026-06 "Standard Test Method for Plastics: Dynamic Mechanical Properties: In Tension" using a thin film fixture. Through this test method a storage modulus of 10 to 60 MPa provides excellent polishing results with low defectivity. Advantageously, the walls have a storage modulus of 10 to 50 MPa. Most advantageously, the walls have a storage modulus of 10 to 40 MPa. Below a 10 MPa storage modulus, the pore walls have insufficient rigidity to survive the mechanical stresses of the coagulation manufacturing process. Above a 60 MPa storage modulus, defect values increase to levels that were unacceptable for demanding polishing processes. From this a relationship exists between the modulus of the polymer in the pore wall and the level of defects generated during polishing.

In addition to the primary set of pores (macropores), a secondary set of pores (herein also referred to as micropores) within the macropore walls provides additional polishing benefits to the polishing pad. The secondary set of pores has an average pore size of 5 to 30 μm and tend to have a more spherical shape than the primary pores. For purposes of the specification, the secondary pore size represents the average diameter of the micropores in the macropore cell wall cut transverse to the polishing surface that bisect the secondary pores. Advantageously, the secondary pores have an average pore size of 5 to 25 μm.

In addition to the micropore size, the cell walls advantageously have a porosity of at least 10% by volume but no greater than 55% by volume. For purposes of the specification, the porosity represents the pore fraction visible in the cell wall with a scanning electron microscope at a magnification of 500× cell walls cut transverse to the polishing surface that bisect the secondary pores. Preferably, the cell walls advantageously have a porosity of at least 20% by volume but no greater than 50% by volume. The cell walls most advantageously have a porosity of around 20 to 40% by volume. Furthermore, the pore walls optionally have a thickness equal to 2 to 10 times the average size of the micropores or preferably 4 to 10 times the average pore size of the micropores.

The creation of porous polymer structures by solvent/non-solvent coagulation technology has been used for many years to make either artificial leather (see for example Encyclopedia of Polymer Science "Leather Like Materials") or synthetic membranes (see for example Encyclopedia of Polymer Science "Membrane Technology"). In the coagulation process a solution of a polymer in a solvent is added to solution that is a non-solvent for that polymer. The polymer phase separates from the solution to form a polymer-rich phase and a polymer-poor phase. The polymer-rich phase constitutes the pore walls and the polymer-poor phase the pores themselves. By controlling the polymer chemistry and coagulation conditions, it is possible to create a wide variety of pore structures for different applications. In addition to creating porous structures using a solvent based polymer solution, it is possible to coagulate an aqueous dispersible polymer coating by processes other than solvent/non-solvent exchange. Possible approaches to destabilize the aqueous polymer dispersion include changing pH, changing ionic strength or changing temperature.

In addition to solvent/non-solvent coagulation, sometimes referred to as immersion precipitation, it is possible to create similar porous structures by other techniques. These include processes such as sintering, stretching, track etching, template leaching and phase inversion. The latter includes precipitation by solvent evaporation, precipitation from vapor phase, precipitation by controlled evaporation and thermal precipitation. Other methods of making interconnected pores are by using supercritical fluids or by low density foam technology.

EXAMPLES

Table 1 summarizes properties of the pads described in the examples below. Included are overall pad properties, metrology data for the macropores, polishing data and the values for several features that define poromeric polishing pads. Examples 1 to 3 represent comparative examples of commercial-polyurethane poromeric polishing pads. Examples 4 to 7 represent polishing pads that demonstrate improved polishing performance over the commercial polishing pads.

Specifics for Table 1 are as follows:

DMA Measurements: The tensile storage modulus of the polymer forming the pore walls of the poromeric coating was determined by dynamic mechanical analysis of cast films. These were prepared by coating the polymer dissolved in dimethylformamide onto a glass plate, removing the solvent at elevated temperature and then removing the dried coating from the glass plate to leave a free-standing film, free of air bubbles and other imperfections, approximately 300 microns thick. After conditioning the film for 5 days at 25° C. and 50% relative humidity, the tensile storage modulus was measured using a Rheometric Scientific™ Solids Analyzer RSA III. Measurements were made in tension using a thin film fixture at a frequency of 10 rad/sec and a temperature of 25° C. in accordance with ASTM D5026-06 "Standard Test Method for Plastics: Dynamic Mechanical Properties In Tension". The samples had dimensions of 20 mm long by 6.5 mm wide.

Pore Metrology Measurements: The primary (macropores) present in the surface of the poromeric polishing layer were characterized by optical microscopy using a Nikon SMZ800™ microscope in combination with Image-Pro® software developed by Media Cybernetics®. Several pore parameters were determined by the software. These included: number of pores (P) present in the measurement area (A); mean area of each pore (MPA); pore diameter; and fraction of pores. From these parameters, the average thickness (w) of each pore wall was calculated using the formula:

$$w = (A/\pi P)^{1/2} - (MPA/\pi)^{1/2}$$

Polishing Conditions: All polishing data were generated using 20 inch (51 cm) diameter pads polished on an Applied

TABLE 1

| | Comparative Examples | | | Examples of Present Invention | | | |
|---|---|---|---|---|---|---|---|
| Pad Parameter | Example 1 | Example 2 | Example 3 | Example 4 | Example 5 | Example 6 | Example 7 |
| Overall Pad Properties: | | | | | | | |
| Total Pad Thickness (mil)/(mm) | 60/1.5 | 32/0.8 | 28/0.7 | 28/0.7 | 60/1.5 | 53/1.3 | 28/0.7 |
| Pad Base Substrate | Felt | Film | Film | Film | Felt | Felt | Film |
| Polishing Layer Thickness (mil)/(mm) | 16/0.4 | 25/0.6 | 21/0.5 | 21/0.5 | 21/0.5 | 16/0.4 | 21/0.5 |
| Pad Compressibility (%) | 14.7 | 20.3 | 21.3 | 21.2 | 12.2 | 15.2 | 22.8 |
| Pad Deflection (mil)/(mm) | 8.3/0.21 | 7.5/0.19 | 5.5/0.14 | 5.5/0.14 | 7.0/0.18 | 7.6/0.19 | 5.9/0.15 |
| Primary Pore (Macropore) Metrology: | | | | | | | |
| Measurement Area (mm$^2$) | 6.0 | 6.0 | 6.0 | 6.0 | 6.0 | 6.0 | 6.0 |
| Pore Count in Meas. Area | 642 | 213 | 514 | 716 | 637 | 575 | 521 |
| Pore Count/mm$^2$ | 107 | 36 | 86 | 119 | 106 | 96 | 87 |
| Mean Pore Area (mm$^2$) | 0.00383 | 0.00320 | 0.00180 | 0.00149 | 0.00223 | 0.00203 | 0.00150 |
| Pore Diameter (μm) | 70 | 64 | 48 | 44 | 53 | 51 | 44 |
| Pore Fraction | 0.410 | 0.114 | 0.154 | 0.178 | 0.237 | 0.195 | 0.130 |
| Secondary Pore (Micropore) Metrology: | | | | | | | |
| Estimated volume fraction of micropores in macropore wall (%) | 0 | >60 | 20-40 | 20-40 | 20-40 | 20-40 | 20-40 |
| Critical Features of The Invention: | | | | | | | |
| Macropore Wall Thickness (μ) | 20 | 63 | 37 | 30 | 28 | 32 | 39 |
| Macro and Micropores | No | Yes | Yes | Yes | Yes | Yes | Yes |
| Modulus of Polymer in Macropore Wall (MPa at 25° C.) | 71 | 45 | 73 | 39 | 39 | 39 | 17 |
| Polishing Data: | | | | | | | |
| Defect Count | 27 | 13 | 41 | 6 | 7 | 11 | 2 |
| TEOS Removal Rate (A/min) | 807 | 945 | 1199 | 1274 | 1100 | 1120 | 1053 |
| Copper Removal Rate (A/min) | 434 | 368 | 749 | 366 | 288 | 339 | 369 |
| TEOS:Cu RR Selectivity | 1.86 | 2.57 | 1.60 | 3.48 | 3.82 | 3.30 | 2.85 |

Mirra® 200 mm Polisher. The pads were either embossed with a cross-hatch design having dimensions of 100 mil (2.5 mm) pitch, 30 mil (0.8 mm) width, and 15 mil (0.4 mm) depth or machined with a cross-hatch groove pattern having dimensions of 180 mil (4.6 mm) pitch, 30 mil (0.8 mm) width, and 15 mil (0.4 mm) depth. The slurry used was LK393c4 made by Dow Electronic Materials at a flow rate of 200 ml/min. Platen and carrier head speeds were 93 rpm and 87 rpm respectively and the down-force was 1.5 psi.

Copper and dielectric removal rate data were measured using blanket Cu and TEOS wafers respectively. Defect metrology data were determined from blanket Cu wafers using a KLA SP1 Blanket Wafer Inspection Tool at 0.08 micron detection limit followed by defect classification using a Vistec INS3300 Leica Defect Review Microscope.

Example 1

Comparative Pad A (Politext™ CMP Polishing Pad)

Comparative Pad A was a polyurethane poromeric pad widely used for many years to polish semiconductor wafers. The pad was made by coating a polyurethane solution in dimethylformamide (DMF) onto a urethane impregnated non-woven polyester felt substrate and then immersing it in a non-solvent/solvent coagulation bath to form a porous coating on that substrate. After rinsing and drying the coated substrate was buffed with abrasive paper to remove the skin layer and to expose the pore structure. The pad was then embossed to create a cross-hatched groove pattern in the polishing layer. The embossed groove pattern facilitates slurry distribution across the pad surface during polishing.

The pore structure of Comparative Pad A included large vertical pores with the dimensions provided in Table 1. The pores were typically 70 microns in diameter and several hundred microns in length (as measured in a transverse cross section and parallel to the polishing surface. Most pores were tapered with the pores being narrower toward the polishing surface. This tapered structure resulted in varied pore density with pad wear; and varied pore density provided inconsistent polishing performance as the pad surface eroded during the pad's lifetime.

The cell walls had low porosity and were free of micropores in the desired range of 5 to 40 microns. Any pores present were significantly less than 5 microns in diameter and usually less than 1 micron. From the macropore metrology data it was possible to calculate the thickness of the pore wall using the equation described earlier. For Comparative Pad A, the calculated pore wall thickness was 20 micron. Since this value was low, it contributed excessive contact forces against the wafer surface that resulted in higher defectivity. The modulus of the polymer forming the pore wall, as measured by the DMA method described above, had a value of 71 MPa. This value was higher than desirable and also resulted in higher defects during polishing.

Referring to the polishing data and conditions of Table 1, the polishing performance of this pad was inadequate for demanding low defect polishing applications. For example, defectivity values were excessive and TEOS removal rates were too low to satisfy throughput requirements for commercial wafer integration structures. Especially, the TEOS:Cu removal rate selectivity ratio was too low for advanced low defect or future polishing needs.

Example 2

Comparative Pad B (H7000HN-PET, Fujibo)

Comparative Pad B was a polyurethane poromeric pad used to polish semiconductor wafers sold by the Fujibo Corporation under the designation H7000HN-PET. The pad appeared to be made by a similar process to that used in Example 1, except that the polishing layer was coated onto a polyester film substrate and included surfactants such as dioctyl sodium sulfosuccinate added to the formulation to control pore structure. The pore structure of Comparative Pad B was different from that of Comparative Pad A. Comparative Pad B had a pore structure consisting of both large macropores and smaller micropores within the pore walls of the macropores.

Although some aspects of this pore structure were desirable for demanding low defect polishing applications, Comparative Pad B achieved the dual pore structure by adding surfactants to the polyurethane formulation. Some of these surfactants contained metal ions such as sodium that can compromise the electrical performance of the devices being polished while other surfactants can result in unacceptable foam generation during polishing.

Secondly, the concentration of micropores in the macropore walls was very high weakening the cell wall that can lead to high pad wear and a reduced pad lifetime. Finally, from Table 1, it can be seen that the calculated pore wall thickness was 63 microns. Thus the pore structure consisted of pores separated by walls that were of comparable dimensions to the diameter of the pores themselves. Such a pore structure adversely affects both slurry transport and contact forces between pad and wafer and was inefficient for more demanding low defect polishing applications.

Example 3

Comparative Pad C (SPM3100™)

Comparative Pad C was a poromeric pad used to polish silicon wafers. The pad was manufactured by Dow Electronic Materials under the SPM3100 designation. The pad was made by a similar process to that used in Example 1 except that the polishing layer was coated onto a polyester film substrate. Although Comparative Pad C had a desirable pore morphology, having both large and small pores and a desirable wall thickness, the modulus of the polymer in the pore wall was too high for low defectivity polishing. This example demonstrated the need to control the modulus of the polymer in the pore wall below a critical value to achieve the very low defect levels required for demanding low defect polishing applications. Also, the TEOS:Cu removal rate selectivity ratio was unacceptably low for advanced low defect or future polishing needs.

Example 4

Film Base Substrate

A polyurethane was synthesized in DMF by reacting a mixture of a polyethylenepropyleneglycol adipate polyol (0.0102 moles) and butanediol (0.0354 moles) with diphenylmethane diisocyanate (MDI) (0.0454 moles) to form a polyurethane having a weight average molecular weight of 50,000 and a polydispersity of 1.6. The resultant polyurethane solution had a room temperature viscosity of approximately 3000 cP at 25 wt % solids. No surfactants were present in the formulation.

A 75 mil (1.9 mm) wet-thickness layer of the above polyurethane solution at 17° C. was coated onto a 7.5 mil (0.2 mm) thick polyester film substrate. The coated film was immersed in a bath containing 14.5% DMF and 85.5% water held at 17°

C. to coagulate the polymeric coating and form a porous microstructure containing both large and small pores.

After rinsing and drying, the coated film was buffed with abrasive paper to remove the skin layer and to expose the pore structure. Grooves were machined in the polishing layer to create a cross-hatched groove pattern with nominal dimensions of 180 mil pitch (4.6 mm), 15 mil deep (0.4 mm) and 30 mil (0.8 mm) width. These grooves facilitated slurry distribution across the pad surface during polishing.

The combination of polyurethane formulation and coagulation conditions resulted in a desirable pore morphology consisting of macropores having an average wall thickness of 30 microns with micropores in the macropore walls. The micropores were approximately spherical, about 10 micron in diameter and their concentration was such that continuous macropore wall existed between the micropores. Thus unlike the high concentration of overlapping micropores present in Comparative Pad B, the micropores in this example did not compromise the strength or stiffness of the macropore wall.

The polyurethane poromeric dual pore structure had several benefits. Firstly, it was responsible for increasing TEOS removal rates to the higher values required for polishing advanced nodes and more importantly significantly increased the TEOS:Cu removal rate selectively ratio to a preferred value. From Table 1, it can be seen that the TEOS removal rate and TEOS:Cu selectively ratio of Example 4 was significantly higher than the corresponding values of the Comparative Pad A of Example 1. Comparative Pad A lacked the secondary micropores within the primary pore walls and did not have the same ability to hold and transport slurry in the pad-wafer gap. Although Comparative Pad B of Example 2 did have both micro- and macro-porosity, both the micropore concentration and the thickness of the macropore wall were too high to maintain optimum contact and slurry transport between the wafer and pad surfaces. Thus the TEOS removal rate achieved by Comparative Pad B was inadequate for demanding low defect polishing applications.

A second benefit of the advantageous dual pore structure of Example 4 was that it reduced the variation in polishing performance as the pad wore. For pads that had a macropore only structure, such as Comparative Pad A of Example 1, changes in removal rate occurred as the pad wore down during polishing. This was a consequence of the macropores having a tapering cross-section such that as the pad wore down, the pore cross-section changed. Polishing data for pads having the advantageous dual pore structure of the present invention established that as the pad wore, removal rates remained near constant or steady throughout the pad lifetime and defectivity was also unchanged—a significant benefit over commercial pads A, B and C.

A third benefit of the dual pore structure of Example 4 was that the presence of the micropores reduced the need to create texture in the pad surface by diamond conditioning. For conventional polishing pads, it is customary to condition the pad surface before and during polishing with an abrasive diamond conditioning disk. This step is time consuming and necessitates the need to purchase expensive diamond conditioning disks. Polishing work has shown that pads with the structure of Example 4 required minimal, if any, diamond conditioning either before or during polishing and that conditioning the pad surface with a simple, inexpensive nylon brush was sufficient to maintain stable removal rates and low defectivity throughout the pad lifetime. The elimination or at least minimization of diamond conditioning resulted in less pad wear and increased pad life.

A fourth benefit of the dual pore structure of Example 4 was that polishing performance became less dependent on the macrogroove design embossed or machined into the pad surface. Macrogrooves were required to prevent stiction between the pad and wafer during polishing and to enable slurry transport in the pad-wafer gap. However, unlike conventional polishing pads, variations in the macrogroove design of pads of Example 4 had only a minor effect on polishing performance.

The storage modulus of the polymer in the pore wall was 39 MPa. This value provided low-defectivity polishing in combination with effective TEOS removal rates and a high TEOS:Cu removal rate selectivity value of 3.5. The pad of Example 4 had a very low defect count value of 6, significantly lower than the defect level of the Comparative Pad Examples A, B and C.

Example 5

Felt Base Substrate

A 75 mil wet-thickness layer of the polyurethane solution was prepared in Example 4 at 17° C., but it was coated on a polyurethane-impregnated non-woven polyester felt substrate. The substrate, manufactured by Dow Electronic Materials, had a density of 0.340 g/cm$^3$, a compressibility of 14%, a thickness of 49 mils (1.2 mm) and a hardness of 49 Shore DO.

The coated felt was immersed in a bath containing 14.5 vol % DMF and 85.5 vol % water held at 17° C. to coagulate the polymeric coating and form a porous microstructure containing both large and small pores. After rinsing and drying the coated substrate was buffed with abrasive paper to remove the skin layer and to expose the pore structure. The polishing layer was then embossed to create a cross-hatched groove pattern with nominal dimensions of 100 mil pitch (2.5 mm), 15 mil deep (0.4 mm) and 30 mil (0.8 mm) width. The embossed groove pattern facilitated slurry distribution across the pad surface during polishing.

Felt substrates have benefits over film in that air bubbles are not trapped between the polishing pad and platen of the polishing tool resulting in poor polishing performance, since the bubbles can dissipate through the permeable felt layer. Secondly, when the polishing layer is applied to film the adhesion of the polishing layer to the film depends on the strength of the adhesive bond. Under some aggressive polishing conditions this bond can fail and result in catastrophic failure of polishing. When felt is used, the polishing layer actually penetrates a certain depth into the felt and forms a strong, mechanically interlocked interface. In contrast to Example 4, in Example 5 the same polishing layer was coated onto a polyester felt rather than a film substrate. The polyester felt was much more compressible and less rigid than the polyester film. Since the polishing layer was made from the same polymer formulation and the coagulation conditions were identical to Example 4, similar dual pore structure, wall thickness and pore wall polymer modulus value were achieved in Example 5. The only difference was the base substrate. From Table 1, it can be seen that the non-woven pad of Example 5 achieved low defect values, high TEOS removal rates and a high TEOS:Cu removal rate selectivity ratio.

This example demonstrated that good polishing performance was also achievable with a non-woven felt base substrate and that as compared to film the problems of air entrapment and adhesive bond failure were eliminated.

Example 6

Felt Base Substrate

A 75 mil wet-thickness layer of the polyurethane solution was prepared in Example 4 at 17° C. and was coated on a polyurethane-impregnated non-woven polyester felt substrate. The substrate, manufactured by Dow Electronic Materials, had a density of 0.318 g/cm³, a compressibility of 17%, a thickness of 44 mil (1.1 mm) and a hardness of 39 Shore DO.

The coated felt was converted to a polishing pad using the same process steps and conditions as described in Example 5.

Example 6 further demonstrated that the non-woven felt substrate produced excellent polishing performance.

Example 7

Film Base Substrate

A polyurethane was synthesized in DMF by reacting a mixture of polyethylenepropyleneglycol adipate (0.0117 moles) and butanediol (0.0259 moles) with diphenylmethane diisocyanate (MDI) (0.0373 moles) to form a polyurethane having a weight average molecular weight of 40,000 and a polydispersity of 1.6. The polyurethane solution was coated on film and converted into a polishing pad using the same process steps and conditions as described in Example 4.

Example 7 differs from Example 4 in that the polyurethane formulation was modified to reduce the modulus of the polymer in the pore wall. Other aspects of the polishing pad, including the dual pore structure and the pore wall thickness, remain similar to the polishing pad of Example 4.

A clear relationship exists between the modulus of the polymer in the pore wall and the level of defects generated during polishing. Thus comparing Examples 7 and 4, values for the modulus of the polymer in the pore walls are 17 and 39 MPa respectively and defect levels are 2 and 6 respectively, clearly demonstrating that reducing pore wall modulus decreases defectivity.

The polishing pad of the invention provides several advantages not achieved by conventional poromeric polishing pads. For example, the dual porosity polishing pads facilitate high TEOS removal rates and high TEOS:Cu removal rate selectivity with low defectivity. In addition, the dual porosity polishing pads require reduced break-in and provide stable removal rates; and achieve these stable rates with reduced conditioning. The pad provides excellent lifetime of 1,000 wafers with limited wear. Furthermore, woven and non-woven substrates provide superior interlayer adhesion and eliminate air entrapment. Finally, the polishing pads are surfactant-free and do not foam during polishing or contribute alkali metals that can diffuse into dielectrics and low-k dielectrics to interfere with polishing.

The invention claimed is:

1. A polishing pad having a polishing surface useful for polishing at least one of magnetic, optical and semiconductor substrates, comprising a porous polishing layer, the porous polishing layer having a dual porosity structure within a polyurethane matrix, the dual porosity structure having a primary set of pores, the primary set of pores being open to the polishing surface, having an elongated structure orthongonal to the polishing surface and having pore walls, the pore walls having a thickness of 15 to 55 µm, a storage modulus of 10 to 60 MPa measured at 25° C. and containing a secondary set of pores within the pore walls, the secondary set of pores being more spherical than the primary set of pores and having an approximately spherical shape and having an average pore size of 5 to 30 µm and wherein the porous polishing layer is formed into a woven or non-woven structure to form the polishing pad.

2. The polishing pad of claim 1 wherein the primary pores have an average diameter of at least 35 µm.

3. The polishing pad of claim 1 wherein a transverse cross section of the pore walls has a porosity of 10 to 55%.

4. The polishing pad of claim 1 wherein the pore walls have a thickness equal to 2 to 10 times the average pore size of the secondary set of pores.

5. The polishing pad of claim 1 wherein the polyurethane matrix is a surfactant-free coagulated structure.

6. A polishing pad having a polishing surface useful for polishing at least one of magnetic, optical and semiconductor substrates, comprising a porous polishing layer, the porous polishing layer having a dual porosity structure within a polyurethane matrix, the dual porosity structure having a primary set of pores, the primary set of pores being open to the polishing surface, having an elongated structure orthogonal to the polishing surface and having pore walls and an average diameter of at least 40 µm, the pore walls having a thickness of 20 to 50 µm, a storage modulus of 10 to 50 MPa measured at 25° C. and containing a secondary set of pores within the pore walls, the secondary set of pores being more spherical than the primary of pores and having an approximately spherical shape and an average pore size of 5 to 25 µm and wherein the porous polishing layer is formed into a woven or non-woven structure to form the polishing pad.

7. The polishing pad of claim 6 wherein the storage modulus of the pore walls is 10 to 40 MPa measured at 25° C.

8. The polishing pad of claim 6 wherein a transverse cross section of the pore walls has a porosity of 20 to 50%.

9. The polishing pad of claim 6 wherein the pore walls have a thickness equal to 4 to 10 times the average pore size of the secondary set of pores.

10. The polishing pad of claim 6 wherein the polyurethane matrix is a surfactant-free coagulated structure.

* * * * *